United States Patent
Brahler et al.

(10) Patent No.: US 12,030,349 B2
(45) Date of Patent: Jul. 9, 2024

(54) RECOIL REDUCING TIRE BEAD SEATER BARREL

(71) Applicant: Gaither Tool Company, Inc., Jacksonville, IL (US)

(72) Inventors: Richard W. Brahler, Jacksonville, IL (US); Daniel W. Kunau, Boone, CO (US)

(73) Assignee: Gaither Tool Company, Inc., Jacksonville, IL (US)

( * ) Notice: Subject to any disclaimer, the term of this patent is extended or adjusted under 35 U.S.C. 154(b) by 631 days.

(21) Appl. No.: 17/069,828

(22) Filed: Oct. 13, 2020

(65) Prior Publication Data

US 2021/0122199 A1    Apr. 29, 2021

Related U.S. Application Data

(63) Continuation-in-part of application No. 16/134,095, filed on Sep. 18, 2018, now Pat. No. 11,273,677, and a continuation-in-part of application No. 15/596,742, filed on May 16, 2017, now Pat. No. 10,800,216, and a continuation-in-part of application No. 14/882,422, filed on Oct. 13, 2015, now Pat. No. 10,800,215.

(51) Int. Cl.
*B60C 25/14*    (2006.01)
*B05B 1/14*    (2006.01)

(52) U.S. Cl.
CPC .............. *B60C 25/145* (2013.01); *B05B 1/14* (2013.01)

(58) Field of Classification Search
CPC ... B60C 25/145; B60C 25/147; B60C 25/132; B60C 25/14; B60C 25/00; B60C 25/12; B05B 1/005; F16L 25/00; B23P 17/00; B60B 31/005; B60S 5/04; B60S 5/043; Y10T 29/49494
See application file for complete search history.

(56) References Cited

U.S. PATENT DOCUMENTS

| 3,683,991 | A | * | 8/1972 | Ruhland | ............... | B60C 25/145 157/1.1 |
| 8,757,236 | B2 | * | 6/2014 | White | ................... | B60C 25/145 157/1.21 |
| 2014/0048216 | A1 | * | 2/2014 | Lundberg | ............. | F16L 41/021 137/15.09 |

* cited by examiner

*Primary Examiner* — Robert J Scruggs
(74) *Attorney, Agent, or Firm* — Robinson & Cole LLP

(57) ABSTRACT

A nozzle for seating a tubeless tire on a rim using pressurized gas includes a coupling neck configured to accept the pressurized gas from a pressurized tank, a choke point adapter connected to the coupling neck and a nozzle body configured with a nozzle output. Pressurized air introduced into the coupling neck pass through the nozzle and exits the nozzle output in a burst of the pressurized gas that is directed between the tubeless tire and the rim to inflate the tire. The choke point adapter has a chokepoint surface with a chokepoint angle of sufficient angle to aid in reducing the recoil of the tubeless tire seating device.

17 Claims, 5 Drawing Sheets

RECOIL REDUCING TIRE BEAD SEATER BARREL

CROSS-REFERENCE TO RELATED APPLICATIONS

This application claims the benefit of and priority to U.S. patent application Ser. No. 14/882,422 filed Oct. 13, 2015 which is incorporated herein by reference in its entirety. This application also claims the benefit of and priority to U.S. patent application Ser. No. 15/596,742 filed May 16, 2017 which is incorporated herein by reference in its entirety. This application also claims the benefit of and priority to U.S. patent application Ser. No. 16/134,095 filed Sep. 18, 2018 which is incorporated herein by reference in its entirety.

BACKGROUND

Technical Field

The present subject matter relates to tools. More specifically, the present subject matter relates to a tool for seating a tubeless tire on a rim configured to reduce the recoil due to the burst of air.

Description of Related Art

Many tires for automobiles, trucks and other equipment are designed to be mounted on wheels or rims without using a tube. The tire may be impervious to air with a bead around the inner edges of the tire designed to press against a lip of the rim to create an air-tight seal so that the combination of the tire and rim may be able to hold pressurized air or other gases suitable for inflating a tire. The rim may include a valve stem that may be used to inflate the tire.

After a tire is first mounted on a rim, the bead of the tire may not press tightly against the lip of the rim so that no air-tight cavity is created. In some cases, especially for smaller tires, enough air may be injected through the valve stem to create a pressure differential between the air inside the tire and the outside air so that, even though air may be escaping between the tire and the rim, the bead of the tire is pressed against the rim to create a seal. This may be referred to as seating the tire on the rim. Seating the tire on the rim allows the tire to be pressurized. But in some cases, especially with larger tires, it is just not possible to seat the tire by injecting air through the valve stem of the rim.

It is well known in the art that it may be possible to blow a high volume of air between the rim and the bead of the tire, creating the pressure differential between the pressure of the air in the tire and the outside air pressure, thereby seating the tire on the rim. Devices to accomplish this generally include a large, yet portable, pressurized air tank with a valve leading to a discharge barrel. The discharge barrel is typically a solid, leakproof metal tube rigidly connected to extend from the tank. The tank and discharge barrel may be positioned to blow a high volume of air from the pressurized air tank into the tire.

SUMMARY

Various embodiments are drawn to nozzles for seating a tubeless tire on a rim using pressurized gas includes an outlet and a jet configured to accept pressurized gas and emit a stream of gas through an orifice into a chamber in the nozzle. According to one embodiment a nozzle for seating a tubeless tire on a rim using pressurized gas has a coupling neck configured to accept the pressurized gas, a choke point adapter connected to and in gaseous communication with the coupling neck, and a nozzle body configured with a nozzle output. The coupling neck, the choke point adapter and the nozzle body are in gaseous communication such that the pressurized gas entering the coupling neck pass through the nozzle and exits the nozzle output in a burst of the pressurized gas directed between the tubeless tire and the rim. The choke point adapter is configured with a chokepoint surface having a chokepoint angle of at least 30 degrees.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings.

DETAILED DESCRIPTION

The present inventor recognized a problem with conventional design. Namely, the conventional bead seater devices result in considerable kickback when the burst of air is fired between the tire and the rim, often making it difficult for a user to keep the conventional bead seater steady and maintain a grip on it. A burst of air is defined as air travelling at a high rate of speed, at least some of which is travelling at a speed of 100 miles per hour or more. The burst of air is controlled by a high speed valve that rapidly opens and closes to produce the burst. Typically, the volume of the burst of air is equal to at least slightly more than the volume of the inflated tire but no greater than three times the volume of the tire. (Some of the burst leaks out of the tire before the bead is seated.) The various embodiments disclosed herein aid in reducing the amount of kickback experienced when discharging a burst of air from the Bead Bazooka™ bead seater device equipped with the recoil reducing bead seater barrel.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Mounting a tire refers to the act of placing a tire on a rim by sliding both beads of the tire over the rim so that the tire is on the rim with both beads between the two lips of the rim. Seating a tire refers to placing the beads of the tire against the lips of the rim, creating a seal and allowing the tire to be inflated to a desired pressure. For the purposes of this specification and claims, a tire is first mounted on the rim before the tire may be seated. With conventional devices it can be quite difficult to seat the tire on a rim so it can be inflated due to the gap between the tire and the rim once the tire has been mounted. Reference now is made in detail to the examples illustrated in the accompanying drawings and discussed below.

Figure 1A:
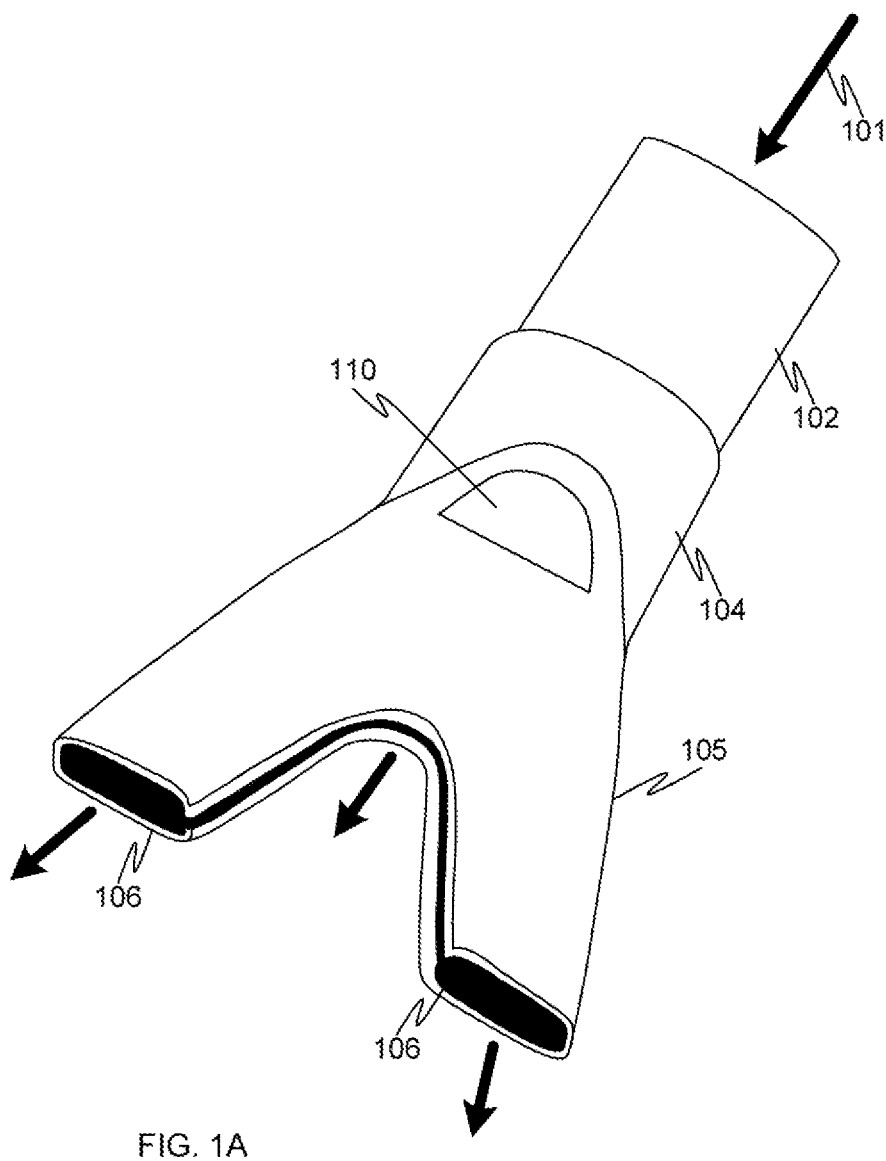
FIG. 1A depicts an isometric view of an embodiment of a tire seating nozzle configured to reduce recoil.

FIG. 1A depicts an isometric view of an embodiment of a tire seating nozzle. The nozzle 100 include a coupling neck 102, sometimes referred to as simply a coupling. The coupling neck 102 may be configured with mechanical means to connect to the nozzle 100 to a source of pressurized gas (not shown). For example, the coupling neck 102 may be configured with threaded so as to screw into the matching threads on a tank that holds pressurized gas. Other embodiments may use other types of connections to a source of pressurized gas including, but not limited to a quick-release coupling, a bayonet type coupling, welding to a pipe or tube, gluing to a pipe or tube, a compression fitting, or other such structures suitable for use as an attachment means.

The dimensions of the coupling neck 102 vary depending upon the size of the tires to be seated and the parameters of the implementation, e.g., the pressure of the pressurized air used to create a burst of air for seating the tire. However, the coupling neck 102 is typically at least one-half in in diameter up to four inches in diameter, with one and one-half inches to two inches being typical diameter values. The length of the coupling neck 102 may vary as well, but is typically between one-half inch to twenty inches, with one inch to four inches being a typical range for the length.

Figure 1B:
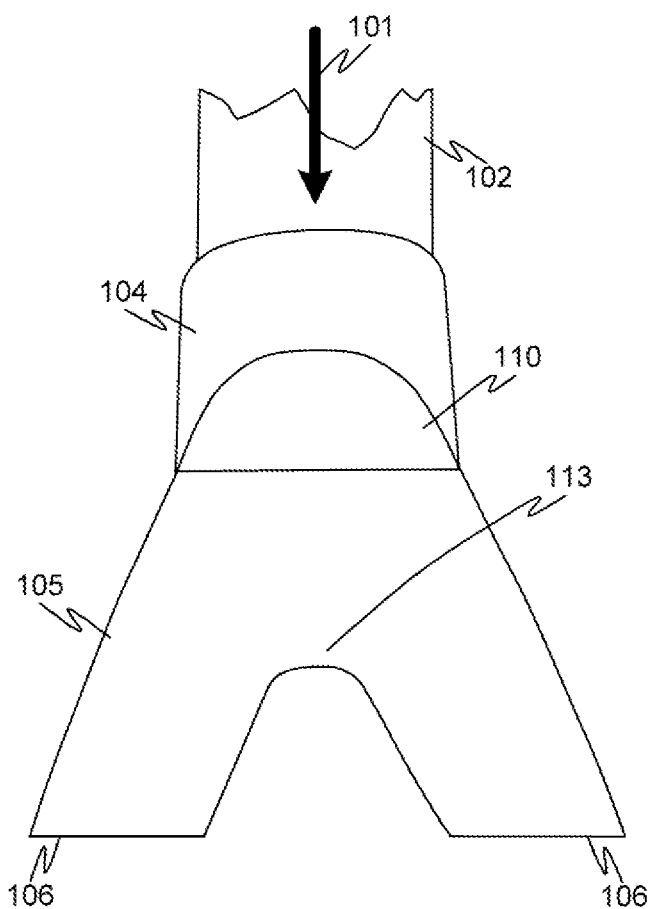
FIGS. 1B-C depict a top view and a side view of the embodiment of a tire seating nozzle depicted in FIG. 1A.
Figure 1C:
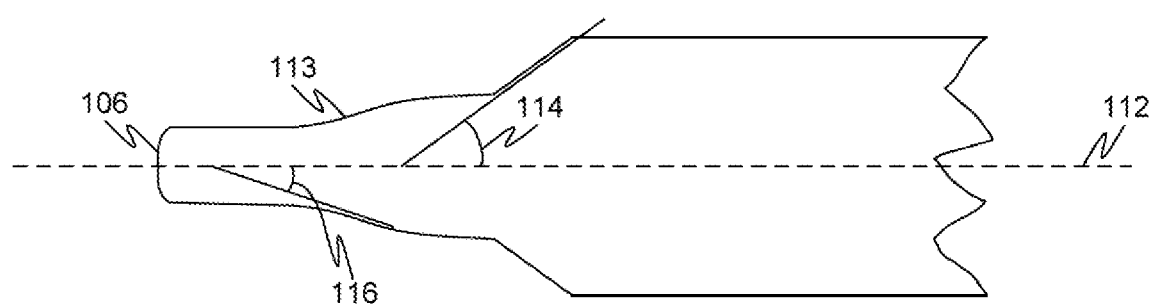

The coupling neck 102 depicted in FIGS. 1A-C is attached to a choke point adapter 104, which in turn, feeds into the nozzle body 105 and out the nozzle output 106. In some embodiments the nozzle body 105 is a separate part and is removably connected to the choke point adapter 104. In other embodiments, such as the embodiment depicted in FIGS. 1A-C, the nozzle body 105 is permanently connected to the choke point adapter 104 forming a nozzle 100 of once piece. The nozzle body 105 may be permanently connected to the choke point adapter 104 by welding, or by other means of connection such as matching male/female threads, gluing or friction fitting. The dimensions of the choke point adapter 104 and nozzle body 105 may vary depending upon the size of the tires to be seated and the parameters of the implementation. Typically, the diameter of the choke point adapter 104 is slightly greater than the diameter of the coupling neck 102—say one-eighth to one-half inch greater. The length of the choke point adapter 104 may vary as well, with a typical length falling within the range of one inch long to four inches long. The widest part of the nozzle body 105 is typically at the nozzle output 106, which in some instances may be as little as one and one-half inches wide to as great as twelve inches wide. A typical width of the widest point of the nozzle body 105 is from three inches to six inches. The length of the nozzle body 105 may vary as well, typically being from two inches long to as much eighteen inches long. For certain extreme applications—e.g., bead seaters for very large tires—the dimensions of these parts may vary beyond those described above.

The coupling neck 102, choke point adapter 104 and nozzle body 105 are in gaseous communication. The term "gaseous communication" means that air (or other gas) means that air entering one part passes through to the next part. Hence, the coupling neck 102, choke point adapter 104 and nozzle body 105 are in gaseous communication such that air entering at 101 passes through the nozzle 100 and exits the nozzle output 106 in a burst of air directed between a tire and a rim. In this way the tire is easily and conveniently inflated onto the rim. The bead seater nozzle 100 has two features that aid in reducing the recoil experienced by a user: the chokepoint angle 114 and the neckdown angle 116. Firstly, as air passes through choke point adapter 104 it encounters a chokepoint surface 110, sometimes called a semi-vertical surface. In various embodiments the chokepoint surface 110 is angled by an amount within the range of 45+/−10 degrees from the center axis 112 running down the center of coupling neck 102. This angle is referred to as the chokepoint angle 114.

In some embodiments the chokepoint angle 114 may as little as 5 degrees, while in other embodiments the chokepoint angle may be greater than 90 degrees, e.g., 120 degrees. The chokepoint angle 114 may be any particular value or range within 5 degrees to 120 degrees. A chokepoint angle 114 greater than 90 degrees creates a pocket of air towards the end of the choke point adapter 104, cutting down on the efficiency of the bead seater nozzle 100. A chokepoint angle 114 as little as 5 degrees produces a slight reduction in recoil that is measurable, but may be difficult to detect by a user. A chokepoint angle 114 that is a value from 30 to 60 degrees produces a significant reduction in recoil felt by a user when a burst of air is fired through the bead seater nozzle 100.

A second feature of the bead seater nozzle 100 that aids in reducing recoil is the amount of the nozzle neckdown at the air division point 113, known as the nozzle neckdown angle 116. In some embodiments the nozzle neckdown angle 116 is less than the chokepoint angle 114. However, depending upon the characteristics and environment in which the bead seater nozzle 100 is to be used, the neckdown angle 116 may be as small as 2 degrees or as large as 90 degrees. The neckdown angle 116 may be any particular value or range within 2 degrees to 90 degrees. The neckdown angle 116, like the chokepoint angle 114, tends to inhibit air as it passes through, thus reducing the recoil of the bead seater nozzle 100 due to it rapidly firing a burst of air between a tire and a rim.

The embodiment depicted in FIGS. 1A-C is described above in terms of having a the chokepoint surface 110 with a chokepoint angle 114 and a portion of the nozzle body 105 with a neckdown angles 116. In implementation the nozzle 100 may be configure with a two chokepoint surfaces 110 and two neckdown angle 116 one on the top and one on the bottom. The two chokepoint surfaces 110 and two neckdown angles 116 may be symmetrical or may vary in the degree they are angled.

Figure 2A:
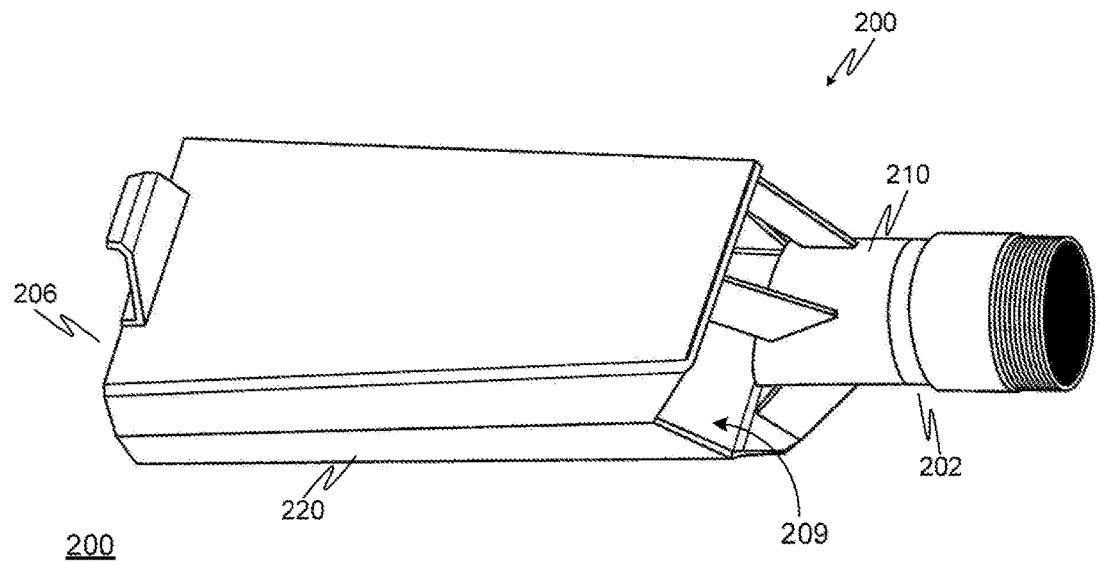
FIGS. 2A-B depict another embodiment of the bead seater nozzle configured to reduce recoil.
Figure 2B:
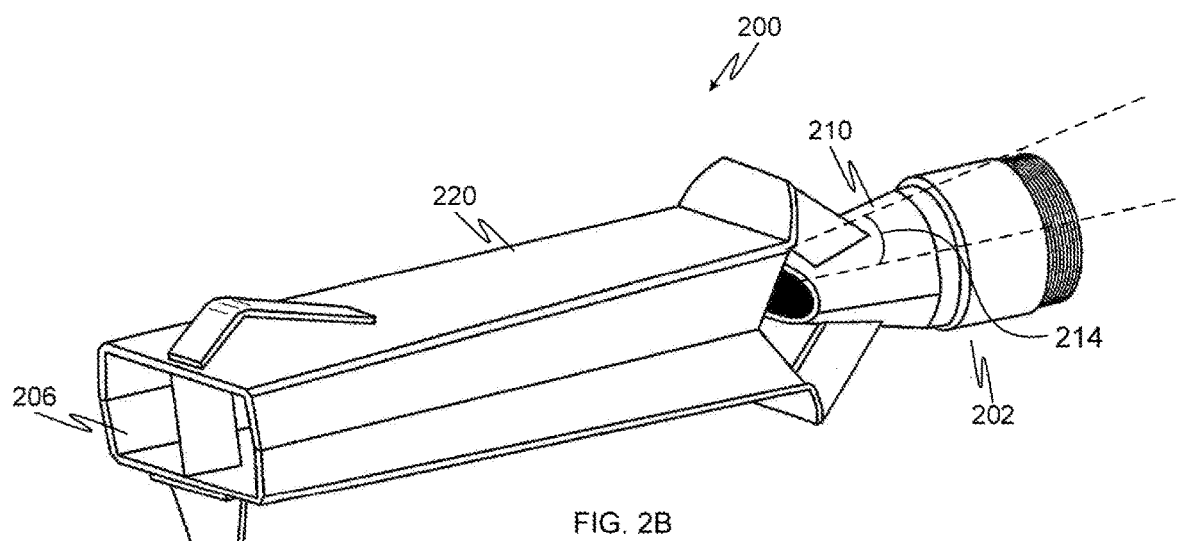

FIGS. 2A-B depict another embodiment of the bead seater nozzle configured to reduce recoil. FIG. 2A depicts an isometric view from a position behind and above the nozzle 200. FIG. 2B depicts an isometric view from a position in front of and below the nozzle 200. Like the embodiment 100, the embodiment 200 depicted in FIGS. 2A-B has a coupling neck 202.

However, unlike the earlier embodiment the coupling neck 202 directs a stream of air into an air intake port 209 of nozzle body 220. This, in turn, cause air to be drawn into the air intake ports 209 of the nozzle 200 due to the Venturi effect. The gas from the storage tank, plus the air drawn into the air intake ports 209, is then blown out of the outlet 206 of the nozzle 200. In this way the nozzle 200 may use the Venturi effect and/or Bernoulli principle to draw atmospheric air into the nozzle 200 as the stream of gas flows through the nozzle 200 to increase the volume of air the is blown into the tire between the tire and the rim. Another aspect of nozzle 200 utilizes the Venturi effect and/or Bernoulli principle to draw atmospheric air into the tire that does not flow through the nozzle. Either of these nozzle designs may increase the overall efficiency of the tire seating device 190 and allow a smaller pressure vessel 191 to be used for a given size of tire 90 than would be required if a more conventional nozzle is used.

The embodiment depicted in FIGS. 2A-B has a pinched down portion referred to as a neckdown surface 210. This differs from earlier models that were designed with a slight tapering to as to reduce the friction of the air passing through the device. The angle at which the neckdown surface 210 is angled from the center axis is referred to as the chokepoint angle 214. In some embodiments the chokepoint angle 214 may as little as 5 degrees, while in other embodiments the chokepoint angle may as great as 90 degrees. Since the chokepoint angle 214 introduces perturbations in the airstream it is preferable that the chokepoint angle not be greater than 90 degrees so as to provide a smooth transition into the nozzle body 220, thus increasing the air drawn into the intake ports 209.

The chokepoint angle 214 may be any particular value or range within 5 degrees to 90 degrees. A chokepoint angle 214 greater than 90 degrees would create pockets of air near the chokepoint surface 110, causing problems with the air being drawn into the air intake ports 209 of the nozzle 200, which in turn would result in lowering the efficiency of the bead seater nozzle 200. A chokepoint angle 214 as little as 5 degrees produces a slight reduction in recoil that is measurable, but, as discussed above, may be difficult to detect by a user. A chokepoint angle 214 that is a value from 30 to 60 degrees produces a significant reduction in recoil felt by a user when a burst of air is fired through the bead seater nozzle 200.

Figure 3A:
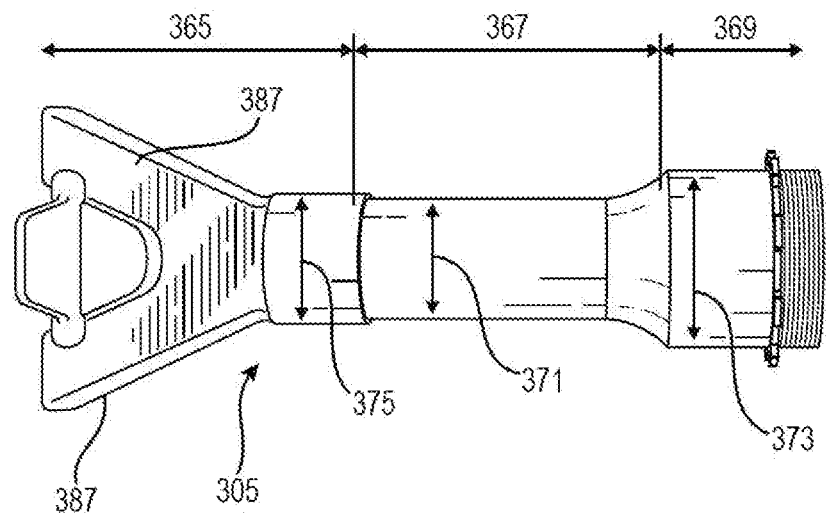
FIG. 3A depicts a top view of the nozzle according to various embodiments disclosed herein.
Figure 3B:
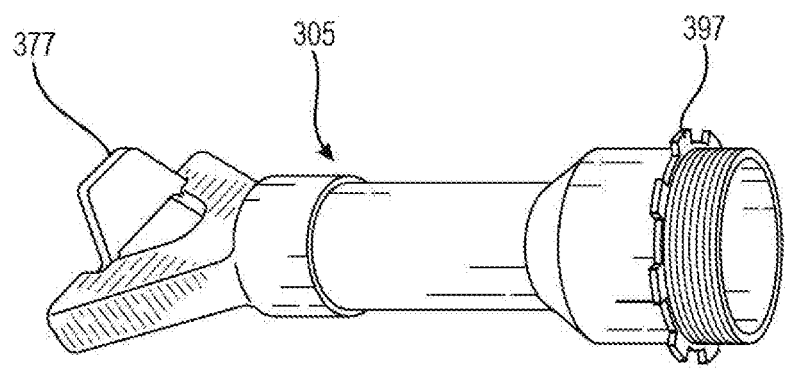
FIGS. 3B-C depict oblique views of the nozzle according to various embodiments disclosed herein.
Figure 3C:
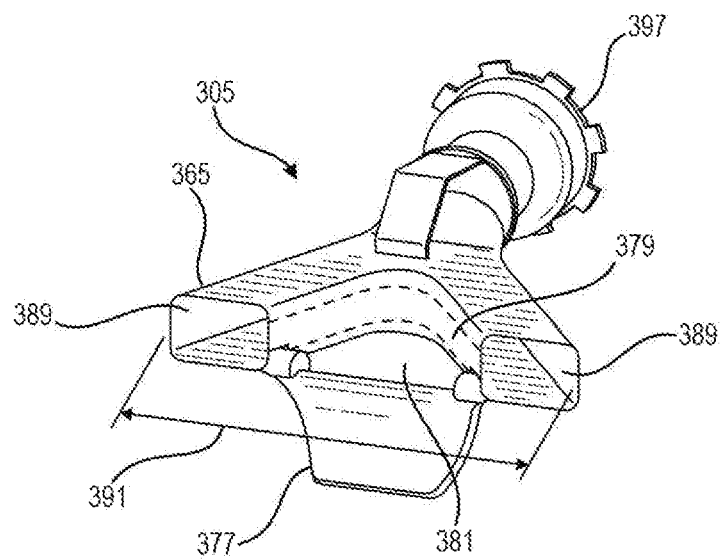

FIGS. 3A-C depicts three views of the nozzle 305 according to various embodiments disclosed herein. FIG. 3A shows the three sections of nozzle 305—the nozzle inlet section 369, the neckdown section 367, and the nozzle outlet section 365. In various embodiments the nozzle outlet section 365 has a "Y" shaped outlet that disperses air around the inside of the wheel and tire rather than blowing a single stream of air directly at the hub of the wheel. The nozzle 305 may also be configured with a tab 377 mounted between the arms of the "Y" shaped nozzle outlet. A user can position the tab 377 against the rim so as to hold the pneumatic tire seater nozzle 305 steady while aiming it between the gap between the tire and the wheel. Various embodiments of the pneumatic tire seater do not have tab 377 since it tends to be more effective in seating a tire to hold the pneumatic tire seater nozzle 305 an inch or more away from the gap between the tire and the wheel and the tab 377 tends to obstruct the air flow between the Y intersection of the nozzle outlet. The nozzle output 106 of FIG. 1A includes the nozzle outlet holes 389 and the gap or vent 379 that runs between the nozzle outlet holes 389. One aspect of nozzle 305 is that it utilizes the Venturi effect and/or Bernoulli principle to draw atmospheric air into the tire that does not flow through the nozzle 305. This is achieved by the stream of air flowing out of the vent 379 that acts to pull in atmospheric air from outside the nozzle 305 down through the throat 381 of nozzle 305 (the crotch of the "Y" shape) and into the gap between the tire and rim along with the air from the nozzle outlet holes 389 and the vent 379. The stream of air flowing out of the vent 379 is known as vent air and the stream of air flowing out of the nozzle outlet holes 389 is known as nozzle outlet hole air. The vent air flowing out of the vent 379 is the air utilizes the Venturi effect and/or Bernoulli principle to draw atmospheric air into the tire that does not flow through the nozzle 305 mentioned above.

Turning again to FIG. 3A, the figure depicts the inside diameter 371 of the neckdown section 367, the inside diameter 375 of nozzle outlet section 365, and the inside diameter 373 of nozzle inlet section 369 (and less than the inside diameter of coupling neck 102 of FIG. 1A which is generally the same, or approximately the same as the inside diameter 373 of nozzle inlet section 369). In various embodiments the inside diameter 371 of the neckdown section 367 is less than the inside diameter 373 of nozzle inlet section 369. This neckdown in the tube size of air path serves to increase the velocity of the air released from the RAR valve through the Venturi effect. Various embodiments of the nozzle have an assortment of different neckdown and inlet (coupling neck) dimensions.

The embodiment depicted in FIG. 3A of nozzle 305 has a neckdown section inside diameter 371 of 1.5 inches and an inlet section inside diameter 373 of 2.125 inches. Since the nozzle 305 neckdown section 367 and inlet section 369 are both round, the respective approximate planar areas of these passageways are: neckdown section 367 area is 1.8 square inches; and inlet section 369 planar area is 3.6 square inches. The ratio between the planar areas of the two passage ways has an impact on the degree of the Venturi effect that is realized. The ratio of the nozzle inlet planar area to the neckdown section planar area is referred to herein as the nozzle neckdown ratio (nozzle inlet planar area/the neckdown section planar area). The nozzle neckdown ratio of the nozzle 305 embodiment depicted in FIG. 3A is 2.0 (3.6 in2/1.8 in2). Various embodiments of the nozzle have nozzle inlets and neckdown cross-sections with a number of different shapes aside from round, including for example: square, rectangular, oval, oblong, rectangular with rounded ends, non-symmetrical, triangular, or other such shapes as are known to those of ordinary skill in the art. These various embodiments of the nozzle have an assortment of nozzle neckdown ratios. For example, in different embodiments the nozzle neckdown ratio may be 1.2 or greater, may be 1.5 or greater, may be 1.75 or greater, may be 2.0 or greater, or may be 2.5 or greater. In some embodiments the nozzle neckdown ratio may be 1.2 to 1.8, may be 1.5 to 2.5, may be 1.75 to 3.5, may be 2.0 to 4.0, or may be 2.5 to 5.0. The nozzle neckdown ratios above are discussed in terms of the nozzle inlet planar area/the neckdown section planar area. The various embodiments may also have neckdown ratios of the same values and ranges as discussed above that are calculated by the coupling neck planar area/the neckdown section planar area.

Figure 3D:
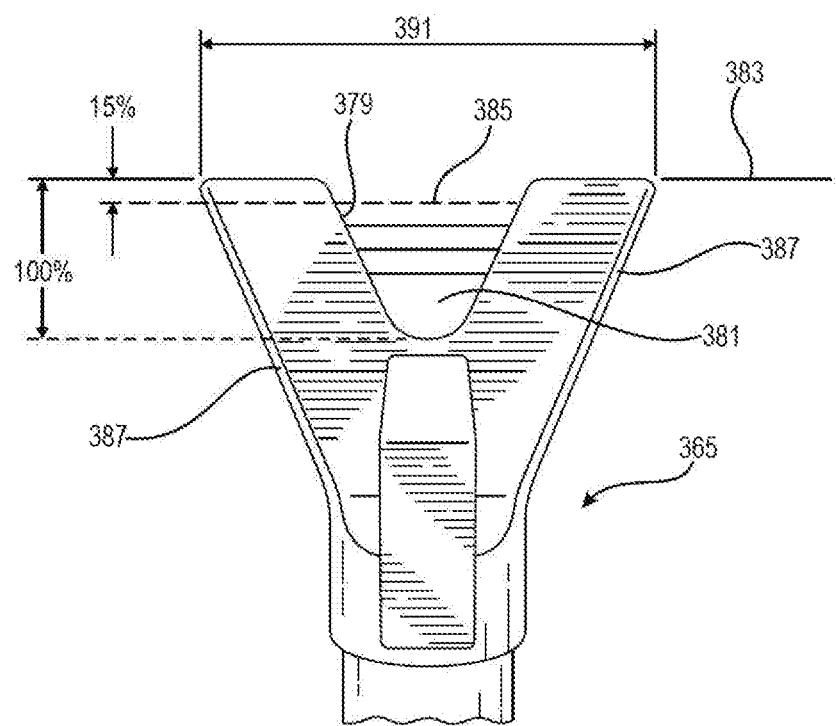
FIG. 3D depicts a top view of a nozzle outlet section, according to various embodiments disclosed herein.

FIG. 3B is an oblique view of nozzle 305 according to various embodiments disclosed herein. In various embodiments the nozzle 305 is provided with male threads on its proximal end (opposite the nozzle output). The male threads are configured to fit female threads just inside the distal end of cylinder 310 as shown in FIG. 3D. A lock washer 397 may be provided on the male threads of the nozzle 305 proximal end. The lock washer 397 may be tightened down in order to properly align the nozzle 305 with the pneumatic tire seater, e.g., to align a line bisecting the pair of nozzle outlet holes 389 with the flat portion 663 of carry handle 615 shown in FIG. 6A.

FIG. 3C is an oblique view showing the nozzle outlet at distal end of nozzle 305. The nozzle may be attached to an RAR pneumatic tire seater by screwing the male threaded end of the nozzle into the female threads of the RAR valve cylinder and tightening the lock nut 393 against the outlet surface of the RAR valve cylinder. The nozzle outlet is "Y" shaped to direct air around the inside of the tire and wheel rather than blowing a single stream of air directly at the hub of the wheel. The throat 381 of nozzle 305 is the crotch of the "Y" shape. Various embodiments of nozzle 305 are configured with a gap or vent 379 that spans the surface of the throat 381. The vent connects from the nozzle outlet hole 389 of one nozzle outlet arm 387 to the nozzle outlet hole 389 of the other nozzle outlet arm 387. Initially it was thought that this vent 379 simply aided in distributing the pressurized air around the inside of the tire and wheel. Recently, however, it was discovered that the vent 379 pulls air in from the atmosphere near the nozzle 305 to go into the tire, in addition to the pressurized air blown from within the tank. To promote this effect some embodiments of the nozzle 305 are constructed without tab 377, since tab 377 tends to impede air being pulled into the tire-wheel gap by the pressurized air flowing from vent 379. In the embodiment depicted in FIG. 3A-D, the nozzle width 391 (just outside the outlet holes 389) is approximately 4.25 inches. In various embodiments the nozzle width 391 may be no greater than 3.0 inches, no greater than 4.5 inches, no greater than 5.0 inches, no greater than 7.0 inches, or no greater than 12.0 inches. Other embodiments may have predefined nozzle widths that are wider or narrower than these specified ranges.

FIG. 3D depicts nozzle outlet section 365, according to various embodiments disclosed herein. Nozzle outlet section 365 is "Y" shaped, and as such, has two nozzle outlet arms 387 and a throat 381 between the two nozzle outlet arms 387. Line 383 is drawn across the tips (extreme distal points) of the two nozzle outlet arms 387. A vent 379 is configured within the throat 381 of the nozzle outlet section 365 along the inner surface of each nozzle outlet arm 387. To distinguish the vent 379 from the nozzle outlet holes 389, the vent 379 is defined as the gap (or gaps) in the nozzle throat 381 from a point 15% inward from the tips of each nozzle outlet arm 387 to 100% of the depth of the throat in a proximal direction, as shown in FIG. 3D. (The line 385 is drawn parallel to line 383 and inward 15% of the way into the throat of the nozzle.) The vent 379 is an opening (or multiple openings) into the interior of nozzle outlet section 365 that allow(s) air to pass out in addition to the air passing out of the nozzle outlet holes 389. The section of the nozzle from 0% to 15% inward from the tips may either be open, as shown in FIG. 3C, or may be closed—depending upon the particularities of the given nozzle implementation.

The ratio of the planar area of the outlet holes 389 to the planar area of the vent (or gap) 379 has an impact on the effectiveness of the air being pulled into the gap between the tire and the rim. This ratio is referred to herein as the nozzle outlet-vent ratio. In the embodiment depicted in FIGS. 3A-D each of the outlet holes 389 has a planar area of approximately 0.645 square inches, and the planar area of the vent 379 (between the 15% points in FIG. 3D) is approximately 0.773 square inches. The area of both outlet holes 389 together is 1.290 square inches (0.645×2). Hence, the nozzle outlet-vent ratio of the FIGS. 3A-D embodiments is 1.290/0.773, or 1.667. The various embodiments have a nozzle outlet-vent ratio that conform to one or more of the following ranges: 0.2 or greater; 0.5 or greater; 0.8 or greater; 1.0 or greater; 1.2 or greater; 1.5 or greater; 2.0 or greater; between 0.2 and 1.0; between 0.5 and 1.5; between 0.8 and 20.0; between 1.0 and 2.5; between 1.2 and 3.0; between 1.5 and 3.5; between 2.0 and 4.0; less than 1.0; less than 1.5; less than 2.0; less than 3.0; less than 4.0; or less than 5.0.

Various embodiments of tire seating nozzles may have a wide variety of different configurations of varying dimensions. Unless indicated to the contrary, the numerical parameters set forth in the preceding specification and attached claims are approximations that can vary depending upon the desired properties sought to be obtained by those skilled in the art utilizing the teachings of the present invention. As used in this specification and the appended claims, the singular forms "a", "an", and "the" include plural referents unless the content clearly dictates otherwise. Thus, for example, reference to an element described as "a port" may refer to a single port, two ports or any other number of ports. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. The "planar area" of a section of pipe is the area (e.g., as measured in square inches) of the pipe's cross-section. A section of pipe characterized by a given planar area means that the given planar was measured for that section of pipe. For example, the neckdown section is characterized by a neckdown section planar area of 1.8 square inches if its cross-sectional area is measured to be 1.8 square inches.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A nozzle for seating a tubeless tire on a rim using pressurized gas, the nozzle comprising:
    a nozzle body configured with a nozzle output;
    a coupling neck configured to accept the pressurized gas;
    at least two nozzle outlet holes at a distal end of the nozzle, wherein the nozzle output includes the at least two nozzle outlet holes;
    a vent spanning between the at least two nozzle outlet holes, wherein the nozzle output includes the at least two nozzle outlet holes;
    wherein the coupling neck and the nozzle body are in gaseous communication such that the pressurized gas entering the coupling neck passes through the nozzle body and exits the at least two nozzle outlet holes and the vent in a burst of the pressurized gas directed into a gap between the tubeless tire and the rim; and
    wherein the vent spanning between the at least two nozzle outlet holes continuously extends between the at least two nozzle outlet holes.

2. The nozzle of claim 1, wherein the burst of the pressurized gas is of sufficient speed and volume to seat the tubeless tire on the rim.

3. The nozzle of claim 1, wherein the burst of the pressurized gas from the at least two nozzle outlet holes and the vent includes vent air and nozzle outlet hole air.

4. The nozzle of claim 3, wherein the vent air tends to draw atmospheric air into the space between the tubeless tire and the rim that does not flow through the nozzle.

5. The nozzle of claim 3, wherein the coupling neck has a coupling neck inside diameter, the nozzle further comprising:
- a neckdown section with a neckdown section inside diameter;
- wherein the neckdown section inside diameter is less than the coupling neck inside diameter resulting in the burst of the pressurized gas travelling faster through the neckdown section than through the coupling neck.

6. The nozzle of claim 5, wherein the neckdown section is characterized by a neckdown section planar area and the coupling neck is characterized by a coupling neck planar area;
- wherein the nozzle is characterized by a nozzle neckdown ratio equal to the coupling neck planar area divided by the neckdown section planar area.

7. The nozzle of claim 6, wherein the nozzle neckdown ratio of the nozzle is 1.2 or greater.

8. The nozzle of claim 6, wherein the nozzle neckdown ratio of the nozzle is 1.75 or greater.

9. The nozzle of claim 3, wherein each of the at least two nozzle outlet holes is characterized by an outlet holes planar area and the vent is characterized by a vent planar area; and
- wherein the nozzle is characterized by a nozzle outlet-vent ratio equal to the outlet holes planar area divided by the vent planar area.

10. The nozzle of claim 9, wherein the nozzle outlet-vent ratio of the nozzle is 1.2 or greater.

11. The nozzle of claim 9, wherein the nozzle outlet-vent ratio of the nozzle is 1.5 or greater.

12. The nozzle of claim 9, wherein the nozzle is characterized by a neckdown ratio of the nozzle of 1.2 or greater; and
- wherein the nozzle outlet-vent ratio of the nozzle is 1.5 or greater.

13. The nozzle of claim 1, wherein the nozzle has a nozzle width of no greater than 5.0 inches.

14. A nozzle for seating a tubeless tire on a rim using pressurized gas, the nozzle comprising:
- a coupling neck with threads that match the threads of a tank holding the pressurized gas allowing the coupling neck to be screwed onto the tank, the coupling neck configured to accept the pressurized gas;
- a nozzle body configured with a nozzle output, the nozzle body in gaseous communication with the coupling neck;
- at least two nozzle outlet holes at a distal end of the nozzle, wherein the nozzle output includes the at least two nozzle outlet holes;
- a vent spanning between the at least two nozzle outlet holes, wherein the nozzle output includes the at least two nozzle outlet holes;
- wherein the pressurized gas entering the coupling neck from the tank passes through the nozzle body and exits the at least two nozzle outlet holes and the vent in a burst of the pressurized gas directed into a gap between the tubeless tire and the rim; and
- wherein the vent spanning between the at least two nozzle outlet holes continuously extends between the at least two nozzle outlet holes.

15. The nozzle of claim 14, wherein each of the at least two nozzle outlet holes is characterized by an outlet-holes-planar-area and the vent is characterized by a vent-planar-area; and
- wherein the nozzle is characterized by a nozzle-outlet-vent-ratio equal to the outlet-holes-planar-area divided by the vent-planar-area.

16. The nozzle of claim 15, wherein the nozzle-outlet-vent-ratio of the nozzle is 1.2 or greater.

17. The nozzle of claim 15, wherein the nozzle-outlet-vent-ratio of the nozzle is 1.5 or greater.

* * * * *